US008125925B2

(12) United States Patent
Skalecki et al.

(10) Patent No.: US 8,125,925 B2
(45) Date of Patent: Feb. 28, 2012

(54) METHOD AND APPARATUS FOR NON-DISRUPTIVE CALL MODIFICATION

(75) Inventors: Darek Skalecki, Kanata (CA); Stephen Shew, Kanata (CA); Jean-Pierre Coupal, Gatineau (CA)

(73) Assignee: Ciena Corporation, Linthicum, MD (US)

( * ) Notice: Subject to any disclaimer, the term of this patent is extended or adjusted under 35 U.S.C. 154(b) by 1201 days.

(21) Appl. No.: 11/279,060

(22) Filed: Apr. 7, 2006

(65) Prior Publication Data

US 2006/0245413 A1 Nov. 2, 2006

Related U.S. Application Data

(60) Provisional application No. 60/675,870, filed on Apr. 29, 2005.

(51) Int. Cl.
*H04L 12/28* (2006.01)
*H04L 12/50* (2006.01)
*H04L 12/56* (2006.01)
*H04Q 11/00* (2006.01)
*G06F 15/177* (2006.01)
*G06F 15/173* (2006.01)

(52) U.S. Cl. ........ 370/254; 370/384; 370/396; 370/400; 370/410; 709/220; 709/223

(58) Field of Classification Search .......... 709/220–226, 709/238–245; 370/254, 438, 439, 465, 384, 370/400–401, 410
See application file for complete search history.

(56) References Cited

U.S. PATENT DOCUMENTS

| | | | | |
|---|---|---|---|---|
| 5,848,055 A | * | 12/1998 | Fedyk et al. | 370/228 |
| 6,084,880 A | * | 7/2000 | Bailey et al. | 370/395.2 |
| 6,597,956 B1 | * | 7/2003 | Aziz et al. | 700/3 |
| 6,665,295 B1 | * | 12/2003 | Burns et al. | 370/389 |
| 6,785,843 B1 | | 8/2004 | McRae et al. | |
| 7,013,084 B2 | * | 3/2006 | Battou et al. | 398/45 |
| 7,127,180 B1 | * | 10/2006 | Khera et al. | 398/156 |

(Continued)

OTHER PUBLICATIONS

International Telecommunications Union, ITU-T Recommendation G.8080/Y.1304, Architecture for Automatically Switched Optical Networks (ASON), Nov. 2001.*

(Continued)

*Primary Examiner* — Alpus H Hsu
*Assistant Examiner* — Jeremy Costin
(74) *Attorney, Agent, or Firm* — Kent Daniels; Blake, Cassels & Graydon LLP

(57) ABSTRACT

A method and system for changing the extent of data plane resources controlled by a control plane for a network connection which spans a contiguous set of nodes controlled by existing network control resources is disclosed. This is done in a non-disruptive manner. This typically involves two steps: i) Creating a new set of control plane resources for said network connection such that said data plane resources are shared with said existing network control resources; and ii) then terminating the existing network control resources such that said data plane resources are fully transferred to the new set of control plane resources without disrupting said network connection. The existing network control resources can be either a control plane resource or a non control plane resource. An example of a non control plane resource is network management software (e.g., an OSS (Operation Support System)), which forms part of the Management Plane. It should be noted that this does not need to be done for a complete end-to-end connection, but rather can be executed for the portion of the end-to-end connection which is to be controlled by the control plane.

17 Claims, 9 Drawing Sheets

U.S. PATENT DOCUMENTS

| | | | |
|---|---|---|---|
| 7,236,453 B2* | 6/2007 | Visser et al. ................. | 370/219 |
| 7,315,897 B1* | 1/2008 | Hardee et al. ................ | 709/229 |
| 7,321,932 B1* | 1/2008 | Monga et al. ................ | 709/227 |
| 2002/0034935 A1 | 3/2002 | Bjelland et al. | |
| 2003/0002103 A1* | 1/2003 | Erfani et al. ................. | 359/127 |
| 2004/0117476 A1* | 6/2004 | Steele et al. ................. | 709/224 |
| 2004/0193729 A1* | 9/2004 | Saraph ......................... | 709/241 |
| 2005/0072480 A1* | 4/2005 | Brandes ....................... | 137/853 |
| 2005/0262232 A1* | 11/2005 | Cuervo et al. ................ | 709/223 |
| 2006/0007867 A1* | 1/2006 | Elie-Dit-Cosaque et al. ........................ | 370/241.1 |
| 2006/0209678 A1* | 9/2006 | Vu et al. ...................... | 370/216 |
| 2006/0268944 A1* | 11/2006 | Xu ............................... | 370/903 |
| 2007/0074039 A1* | 3/2007 | Li ................................. | 713/182 |

OTHER PUBLICATIONS

Call Modification RSVP Details for UNI 2.0, Optical Internetworking Forum (OIF), Jun. 30, 2005, Contribution No. 2005.216.00.

CCAMP Working Group, Internet Draft, draft-caviglia-mp2cp-00.txt, Nov. 2003.

Network Working Group, Internet draft, Label Switched Path Stitching with Generalized MPLS Traffic Engineering—draft-ietf-ccamp-lsp-stitching-03.txt, Mar. 5, 2006, CISCO Systems. Inc.

* cited by examiner

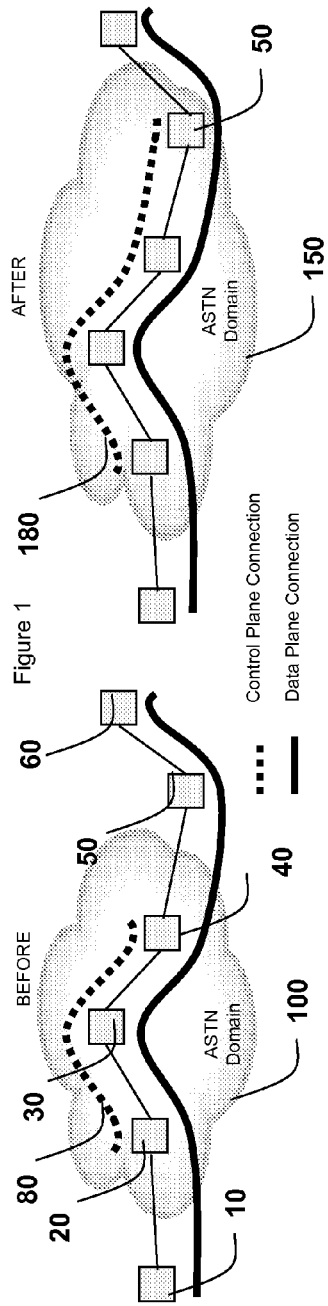
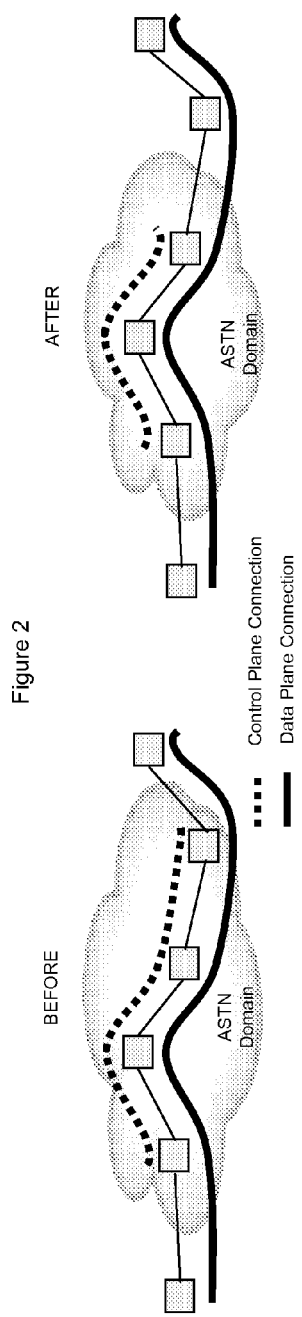
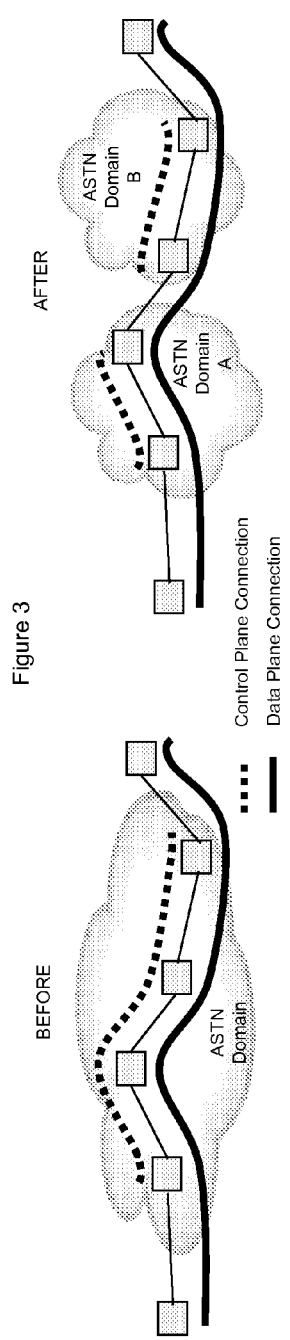
Figure 1
Figure 2
Figure 3

METHOD AND APPARATUS FOR NON-DISRUPTIVE CALL MODIFICATION

CROSS REFERENCE TO RELATED APPLICATIONS

This application claims the benefit of priority of U.S. Provisional Patent Application No. 60/675,870 filed Apr. 29, 2005, which is incorporated herein by reference.

FIELD OF THE INVENTION

The present invention relates generally to telecommunication networks. More particularly, the present invention relates to such networks which utilize a control plane to control calls.

BACKGROUND OF THE INVENTION

Today's telecommunication networks are increasingly characterized by the separation of the control and data planes. That is, data plane connections used to transport traffic and their associated control plane connections used to manage the data plane connections are somewhat independent.

All network operators over time increase or decrease the sizes of their networks, or alter the configuration their networks. There are many business reasons for this, including mergers, divestitures or re-organizations of carriers and enterprises, or the addition of updated equipment. Network operators may want to make a variety of adjustments to their networks, including growing (e.g., adding nodes) and/or shrinking (e.g., removing nodes). Some of adjustments do not necessarily affect the data plane which actually carries the user traffic. However, these adjustments do affect the control plane and/or network management systems. Examples of such adjustments include splitting, merging and/or modifying the span of control of existing connections. In other words, modifying the span of control plane connections. These adjustments will be discussed in more detail below.

However there are some connections which have long durations, and it is highly desirable to avoid any disruption to services offered through these connections while making said adjustments.

It is, therefore, desirable to provide a method for adjusting the span of control of a network in a non-disruptive manner.

SUMMARY OF THE INVENTION

Generally, the present invention provides a method and system for changing the extent of data plane resources controlled by a control plane for a network connection which spans a contiguous set of nodes controlled by existing network control resources. This is done in a non-disruptive manner. This typically involves two steps:

i) Creating a new set of control plane resources for said network connection such that said data plane resources are shared with said existing network control resources; and ii) then terminating the existing network control resources such that said data plane resources are fully transferred to the new set of control plane resources without disrupting said network connection.

The existing network control resources, for any given node, can be either a control plane resource or a non control plane resource. An example of a non control plane resource is network management software (e.g., an OSS (Operation Support System)), which forms part of the Management Plane.

It should be noted that this does not need to be done for a complete end-to-end connection, but rather can be executed for the portion of the end-to-end connection which is to be controlled by the control plane. In other words, although a subset of the whole network connection may undergo a transfer of control ownership, the data being passed over the whole network connection is not adversely affected.

According to one aspect of the invention, the method works by permitting creation of new control plane connection(s) on top of existing control and/or non-control plane connection(s) for a data plane connection. Once the new control plane connection(s) is(are) created then the old control and non-control plane connection(s) is(are) terminated leaving only the new control plane connection(s). Similarly, new control plane calls is(are) created that is(are) associated with the new control plane connection(s), and replace(s) the old control plane call(s) when the new control plane connection(s) become(s) active.

In a further aspect, the present invention provides a method for changing the extent of data plane resources controlled by a control plane for a network connection which spans a contiguous set of nodes, said network connection controlled by existing network control resources, said method comprising the steps of: i) Creating a new set of control plane resources for said network connection such that said data plane resources are shared with said existing network control resources; and ii) then terminating the existing network control resources such that said data plane resources are fully transferred to the new set of control plane resources without disrupting said network connection. Such a method has particular benefits when at least some of said existing network control resources comprise existing control plane resources, or when the number of nodes controlled by said new set of control plane resources differs from the number of nodes controlled by said existing control plane resources. According to one embodiment, such a method includes creating connection control states for the new set of control plane resources on every node; and mapping the existing data plane resources to each new connection control state.

Such a method can be used for growing, shrinking, splitting, merging, or modifying the span of control of the control plane for a network connection. In the shrinking case, it should be noted that data plane resources no longer controlled by control plane resources are transferred to non control plane resources.

A further aspect of the invention provides a method of controlling a network connection between X nodes in a network, wherein a first subset Y of said nodes is controlled by a control plane, and a second subset (X−Y) is not controlled by a control plane, comprising adjusting Y by a delta Z without adjusting the data plane connections between said X nodes. According to one embodiment, said adjusting Y step comprises: a) establishing new control plane connections for Y+Z in parallel to the existing control plane connections for Y, said new control plane connections and said existing control plane connections sharing the same data plane resources; and b) then terminating the existing control plane connections such that said data plane resources are fully transferred to the new control plane connections without disrupting said network connection.

Further aspects of the present invention include a network for implementing any of the above; a Network node for such a network; and a computer program product embodied in a machine-readable medium tangibly embodying computer executable instructions for updating a network node to be compliant with any of the above.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 1 is a schematic network drawing, split into 2 parts, Before and After, illustrating growing the span of control for the control plane connection associated with a data plane connection.

FIG. 2 is a schematic network drawing, split into 2 parts, Before and After, illustrating shrinking the span of control for the control plane connection associated with a data plane connection.

FIG. 3 is a schematic network drawing, split into 2 parts, Before and After, illustrating an example of splitting the span of control for the control plane connection associated with a data plane connection.

DETAILED DESCRIPTION

Figure 4:
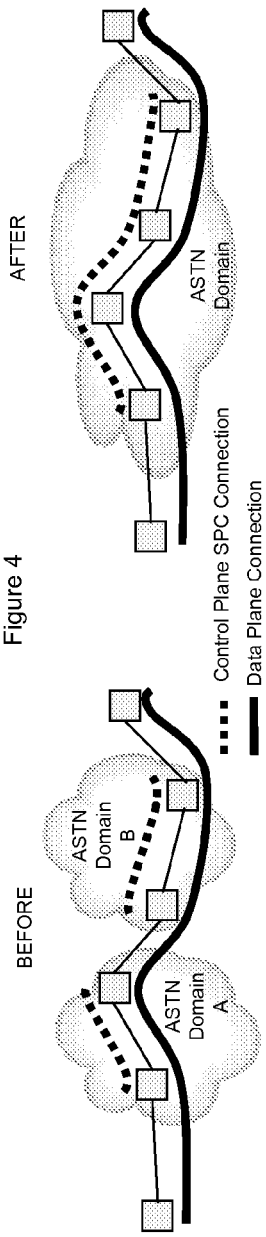
FIG. 4 is a schematic network drawing, split into 2 parts, Before and After, illustrating an example of the reverse of FIG. 3, namely, merging the span of control for the control plane connection associated with a data plane connection.

Exemplary embodiments of the invention will be described with reference to the example of an ASON control plane, as described in the Recommendation G.8080/Y.1304, *Architecture for the Automatically Switched Optical Network (ASON)*, which is a published ITU-T Document, which is hereby incorporated by reference in its entirety. However, it should be noted that the invention is also applicable to control planes for other protocols and networks, including ATM, Telephony, Frame Relay, ISDN, MPLS, GMPLS and X.25. Note that ASON and ASTN are used interchangeably in this specification. The term "connection" as used includes the definition found in ITU-T Recommendation G.805 (2000), "Generic functional architecture of transport networks" and also used in ITU-T Recommendation G.8110/Y.1370 (2005), "MPLS layer network architecture", both of which are hereby incorporated by reference.

Furthermore, we discuss embodiments of the invention with reference to modifying the span of control of connections. However it should be noted that the invention is more broadly applicable to communication services, which include calls and the connections involved therein. It should be noted that the term "call" has a technical definition, which is broader than the conventional "telephone call" between two people. In this specification, a call is the representation of the service offered to the user of a network layer, while the connection is one of the means by which networks deliver said service. There may be other entities used in supporting calls, such as service specific processes. Without limiting the generality of the foregoing, a call can be described as an association between two or more users and one or more domains that supports an instance of a service through one or more domains. Within domains, the association is supported by network entities that contain call state. Between a user and a network call control entity and between network call control entities, there are call segments. The call consists of a set of concatenated call segments. More information about calls, connections and the control plane is described in the Recommendation G.8080/Y.1304.

FIG. 1 is a schematic network drawing split into 2 parts, Before and After, illustrating an example of growing the span of control for the control plane connection associated with a data plane connection. Such an operation may be required as control plane domain grows to encompass nodes and links utilized by a data plane connection but previously not under the control plane's control. For example, ASON domain control plane growth to incorporate a node previously managed by a non-control plane network control resource, for example, network management software (e.g., an OSS (Operation Support System)), which forms part of the Management Plane.

As shown in the Before part of the figure, there are 6 nodes 10, 20, 30, 40, 50 and 60 involved in a connection each node being controlled by existing network control resources. As shown, there is an end-to-end data plane connection spanning each of nodes 10-60. In this example, a first subset of the nodes, namely nodes 20, 30 and 40 are part of an ASON domain 100. Accordingly, a control plane connection 80 controls the connection between nodes 20 and 30 and between nodes 30 and 40. A second subset of the nodes which are also involved in the call, namely nodes 10, 50 and 60, fall outside of the ASON domain 100. Thus nodes 10, 50 and 60 are controlled by non-control plane management software—e.g. OSS.

The AFTER part of the figure shows ASON domain 100 is expanded to include node 50, and this expanded domain is shown as ASON domain 150. Accordingly the control plane connection 180 now spans nodes 20, 30, 40 and 50, i.e. the span of control plane connection has lengthened/grown to encompass node 50. The call associated with connection 80 is also modified to be associated with the new connection 180.

FIG. 2 is a schematic network drawing, split into 2 parts, Before and After, illustrating an example of shrinking the span of control for the control plane connection associated with a data plane connection. Such operations may be required as control plane domain shrinks relinquishing control of one or more nodes utilized by the data plane connection. For example, ASON domain shrinkage releasing control of a nodes to an OSS. In this example, FIG. 2 effectively represents the reverse operation of FIG. 1. In the Before half of FIG. 2, node 50 is part of the ASON domain. In the After half of FIG. 2, node 50 is no longer part of the ASON domain, and it is subsequently controlled by an OSS.

FIG. 3 is a schematic network drawing, split into 2 parts, Before and After, illustrating an example of splitting the span of control for the control plane connection associated with a data plane connection. In this example, a single domain is divided into 2 smaller domains. Such operations may be required as a control plane domain is divided into 2 (sub) domains, for example, resulting from a divestiture or re-organization.

FIG. 4 is a schematic network drawing, split into 2 parts, Before and After, illustrating an example of the reverse of FIG. 3, namely, merging the span of control for the control plane connection associated with a data plane connection. In this example, 2 smaller domains are merged into a single ASON domain. Such operations may be required, for example, resulting from a merger, acquisition or re-organization.

Figure 5:
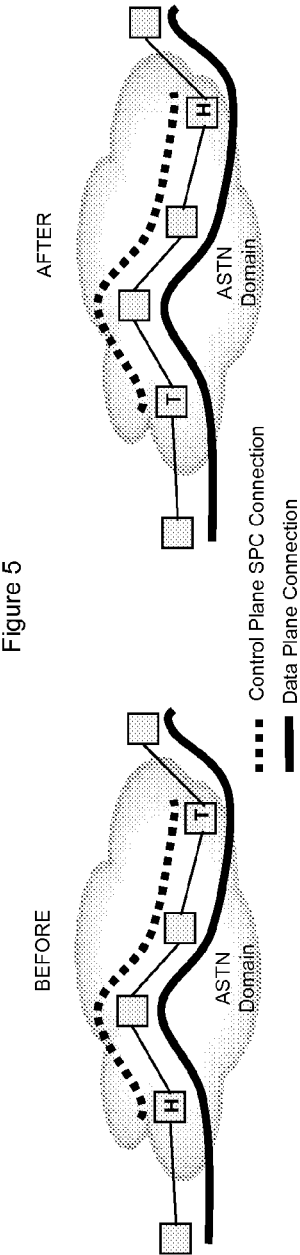
FIG. 5 is a schematic network drawing, split into 2 parts, Before and After, illustrating an example of reversing Head and Tail end functionality for a control plane connection associated with a data plane connection.
Figure 6:
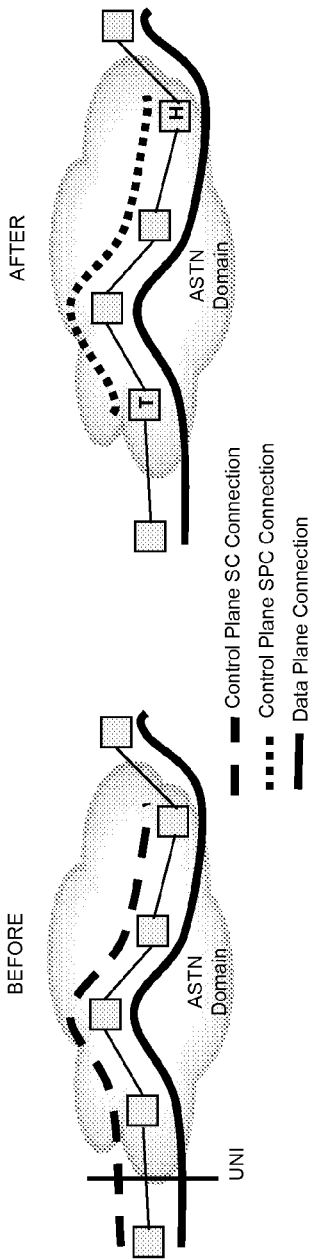
FIG. 6 is a schematic network drawing, split into 2 parts, Before and After, illustrating an example of turning an SC connection into an SPC connection.

Other examples of changing the span of control for such connections by reversing the Head and Tail end functionality of the connection, which is illustrated in FIG. 5, or by turning a Switched Connection (SC) connection that is initiated by a user, into a Soft Permanent Connection (SPC) connection that is initiated by a management plane application. Turning an SC connection into an SPC connection is illustrated in FIG. 6. This involves removing the use of a UNI between a client and network.

It should be appreciated that these all represent simplified examples, and other modifications can be made; for example, more than one node can be added or removed, or multiple domains can be involved with splits or mergers.

Each of these adjustments to the span of control can be implemented by a two-step process according to an embodiment of the invention:

1. New control plane connections are created in addition to at least some of the existing network control resources of a data plane connection. Where their data plane resources are common, resource sharing is applied.

2. Once the new control plane connections are created then the network control resources to which resource sharing is applied in the first step, are terminated. Note that as part of this termination the ownership of the affected segments of the data plane connection are transferred from the existing network control resources to the new network control resources. Control plane calls associated with the replaced control plane connections are also replaced with calls associated with the new control plane connections.

It should be noted that although described in the plural, any of the connections can be singular.

Note that the new and old control plane connection(s) share the same data plane connection resources. The resource sharing can, for example, be implemented utilizing the resource sharing mechanisms described in U.S. Pat. No. 5,848,055, and in patent application Ser. No. 10/717,648, filed 21 Nov. 2003 with the US Patent Office, both of which are hereby incorporated by reference. The resource sharing mechanism allows two independent control plane connections to share the same data plane resources. In the example of ASON, these resources include SON ET/SDH time-slots. Note also that this mechanism can be implemented in-service as it doesn't impact the data plane connection, but simply manipulates control plane connection(s) associated with the data plane connection.

Figure 7:
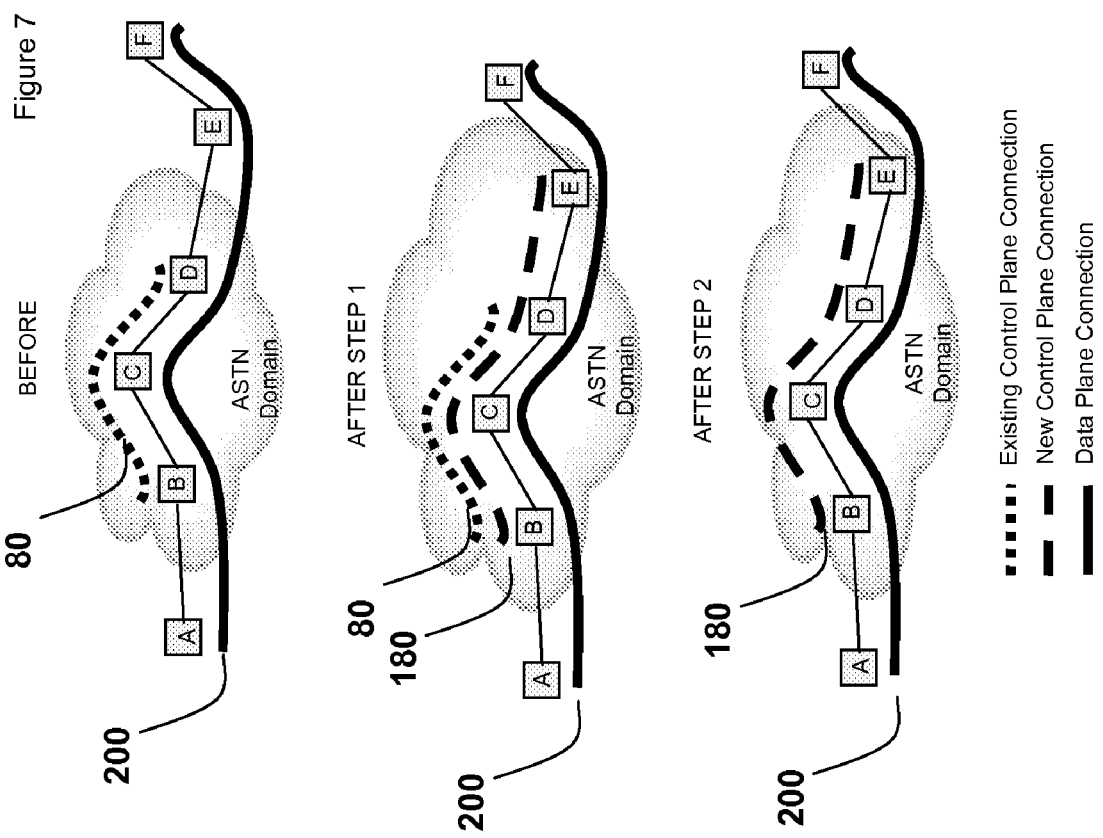
FIG. 7 is a schematic network drawing, split into 3 parts, Before, After Step 1 and After Step 2, illustrating an example of a two step process for growing the span of control plane connection for a particular data plane connection, according to an embodiment of the invention.

An example of the above two step process for growing the span of control plane connection for a particular data plane connection, is illustrated in FIG. 7, according to an embodiment of the invention. The BEFORE network contains a single data plane connection, 200, with an associated control plane connection, 80, in the ASON Domain. In this example, the ASON Domain is to be extended to include another node (node E), thereby requiring modification to the control plane connection, i.e. to extend the span of control of the control plane connection. The first step is to create a new control plane connection, 180, such than the existing control plane connection 80 and the new control plane connection 180 share the same data plane connection 200. A new call associated with connection 180 is also created. Note that at this point the ownership of the data plane connection 200 within the extended ASON Domain remains with the original control plane connection 80. The AFTER STEP 1 network shows this scenario. Once the new control plane connection 180 is successfully created then the second step is to terminate the original control plane connection 80 and its associated call. During this termination, the ownership of the data plane connection 200 is transferred from the original control plane connection 80 to the new control plane connection 180 and its associated call. The AFTER STEP 2 network shows this scenario.

More details regarding the example of FIG. 7 are discussed below with reference to FIGS. 9-13.

Figure 8:
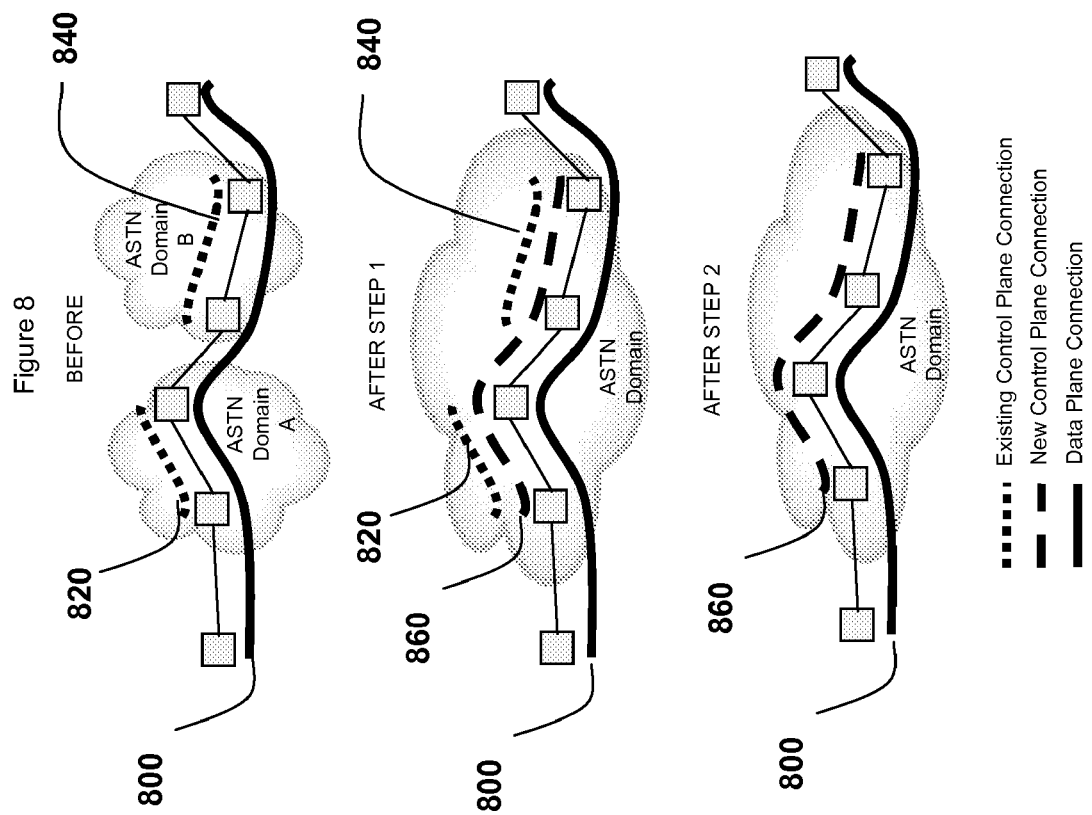
FIG. 8 illustrates the two step process for merging two control plane connections of a single data plane connection into a single control plane connection, according to an embodiment of the invention.

FIG. 8 illustrates the two step process for merging two control plane connections (and calls) of a single data plane connection into a single control plane connection, according to an embodiment of the invention. The BEFORE network contains a single data plane connection 800, a first associated control plane connection 820 for ASTN domain A and, a second associated control plane connection 840 for ASTN domain B. The two ASTN Domains are to be merged to form a single ASTN Domain, thereby requiring modification to the two control plane connections, i.e. to merge them into a single control plane connection. The first step is to create a new control plane connection, 860, such that the two existing control plane connections 820, 840 and the new control plane connection 860 share common data plane resources from data plane connection 800. A call associated with connection 860 is also created. Note that the ownership of the data plane connection within the newly merged ASTN Domain remains with the two original control plane connections 820 and 840. The AFTER STEP 1 network shows this scenario. Once the new control plane connection 860 is successfully created then the second step is to terminate the two original control plane connections 820 and 840, and their associated calls. During this termination, the ownership of the data plane connection 800 portions is transferred from the original control plane connections 820 and 840 to the new control plane connection 860 and its call. The AFTER STEP 2 network shows this scenario.

FIGS. 7 and 8 illustrate two examples. However the invention is applicable to other adjustments to the span of control of the control plane connection, including the examples discussed above with reference to FIGS. 2, 3, 5 and 6. Note the invention is applicable to calls and the connections which comprise the calls.

Figure 9:
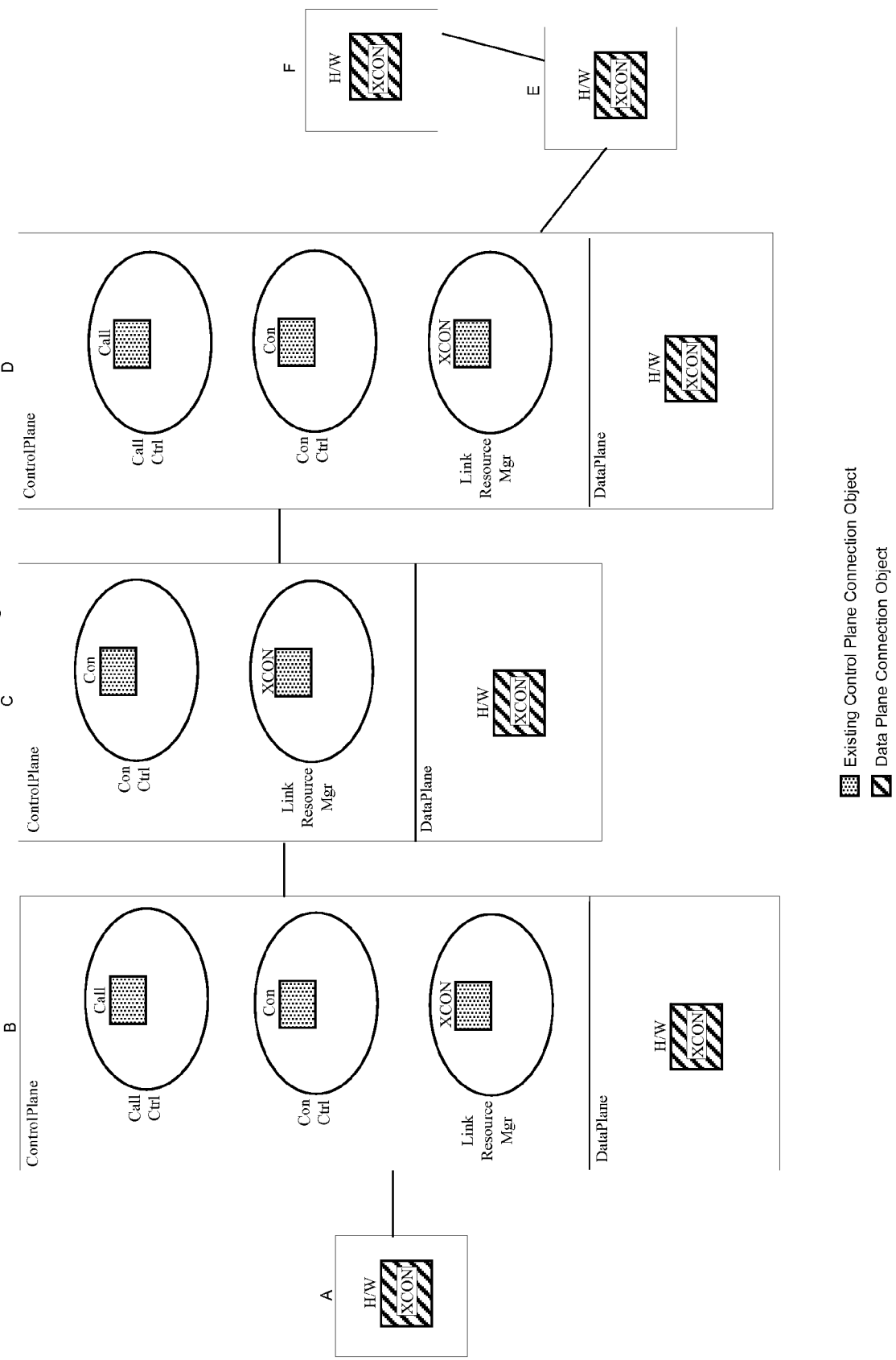
FIG. 9 shows the network objects for the example of FIG. 7, according to an embodiment of the invention present in the network before the expansion of the control plane's span of control.

FIGS. 9-13 show details of the network objects for the example of FIG. 7, according to an embodiment of the invention, utilizing a distributed control plane implementation. FIG. 9 shows the objects present in the network before the expansion of the control plane's span of control. FIG. 9 shows that each of the nodes B, C, and D have both a call state and connection state in the control plane. The hashed objects represent the data plane connection objects, while the dotted objects represent the existing control plane call and connection objects. These control plane call and connection objects reside only within the boundaries of the ASTN domain which is to be expanded to also include node E.

Figure 10:
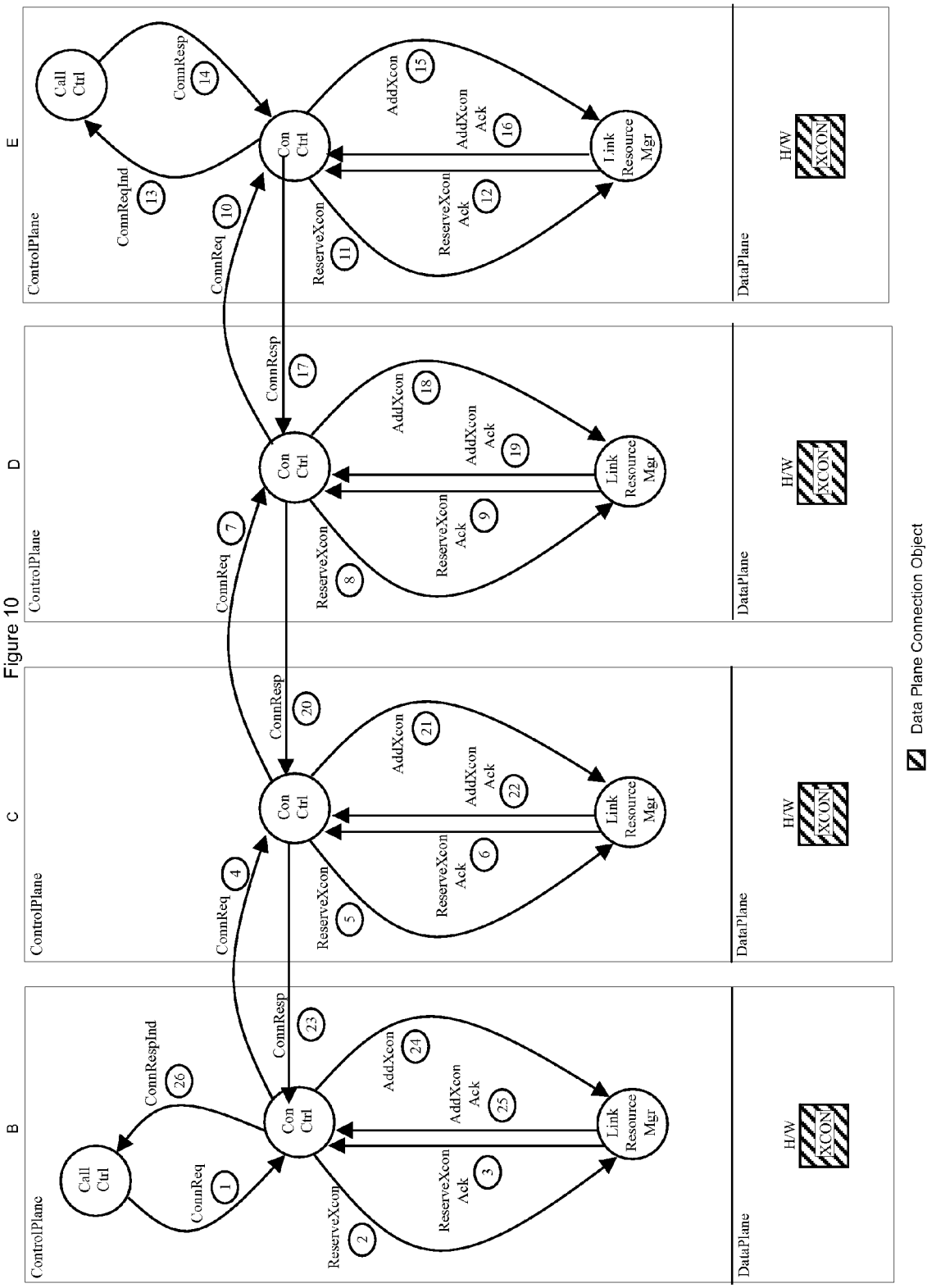
FIG. 10 shows an example of the message sequence used to create a new control plane call and connection objects in accordance with the first step of the process.

FIG. 10 shows an example of the message sequence used to create a new control plane call and connection objects in accordance with the first step of the invention. This new control plane call and connection objects are created by establishing connection objects between each successive node from node B to node E, and call objects on nodes B and E. Note that each node is shown to have hardware for providing the physical connections, and a Link Resource Manager which controls the data plane hardware used in data transfer. Note that for a brand new call, the Link Resource Manager would control the setting up of a physical connection (i.e., the data plane resources, e.g. controlling the hardware ports, fabric, channel etc) for a data plane connection. However during step 1, as the data plane resources are already established, the Link Resource Manager does not establish additional data plane resources, but rather associates the existing data plane resources to the newly established control plane connection. As previously stated this is done so that the data plane resources are shared by the existing control plane connection 80 and by the new control plane connection 180.

Figure 11:
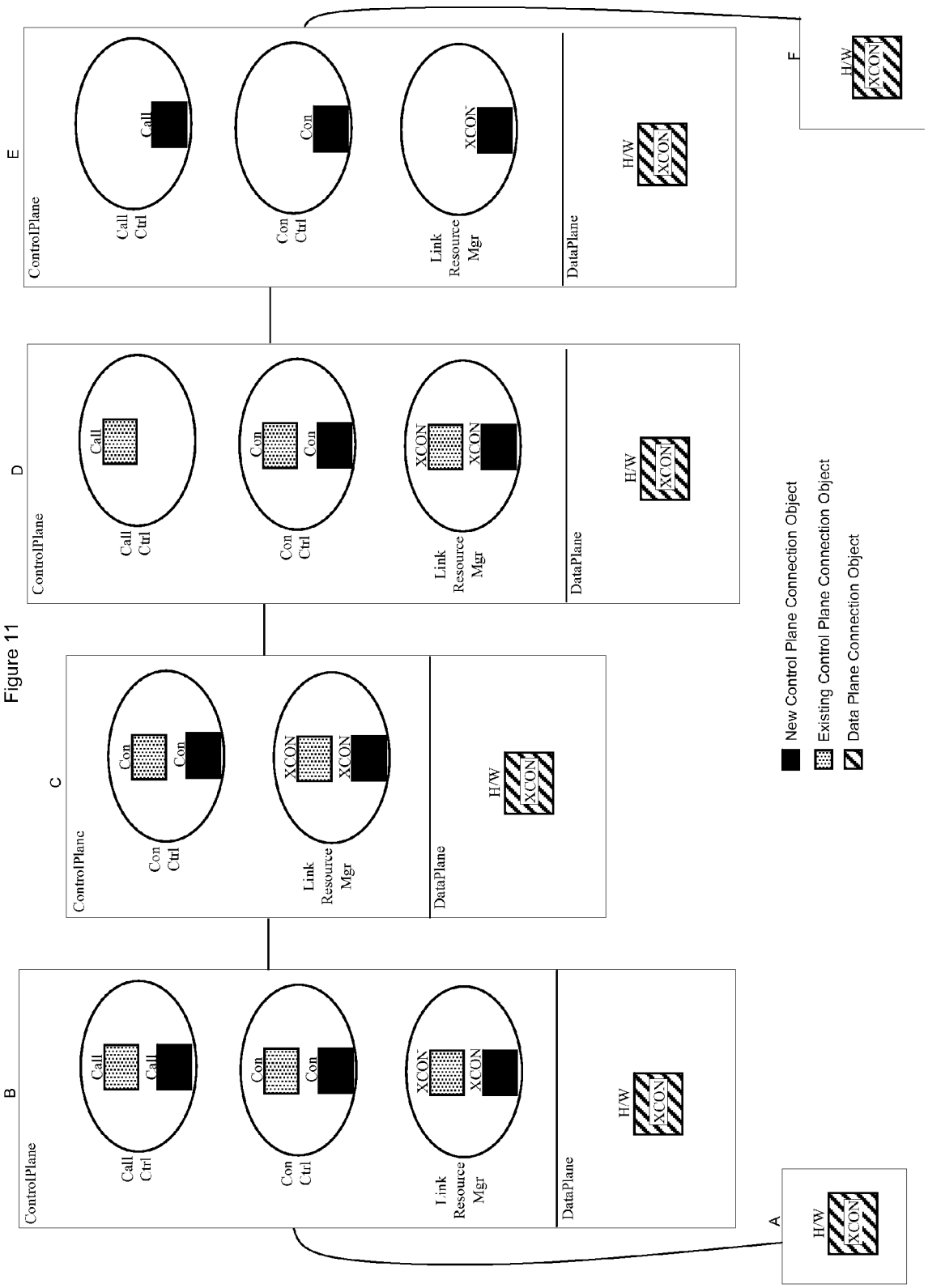
FIG. 11 shows the objects after performing the first step.

FIG. 11 shows the objects after performing the first step, which include the data plane connection objects, the original control plane connection (and call) objects, and the new control plane connection (and call) objects. Note that the original and the new control plane connection XCON objects representing the data plane connection within Link Resource Mgr share the same data plane connection XCON objects. At this stage the ownership of these data plane connection XCON objects remains with the original control plane connection XCON objects.

As stated, this example illustrates a distributed control plane implementation where each node includes the controller for executing a Link Resource Manager function, and Connection Control Function and a Call Control function (the Ovals), where each function creates an instance for each connection (the squares) and/or call.

Figure 12:
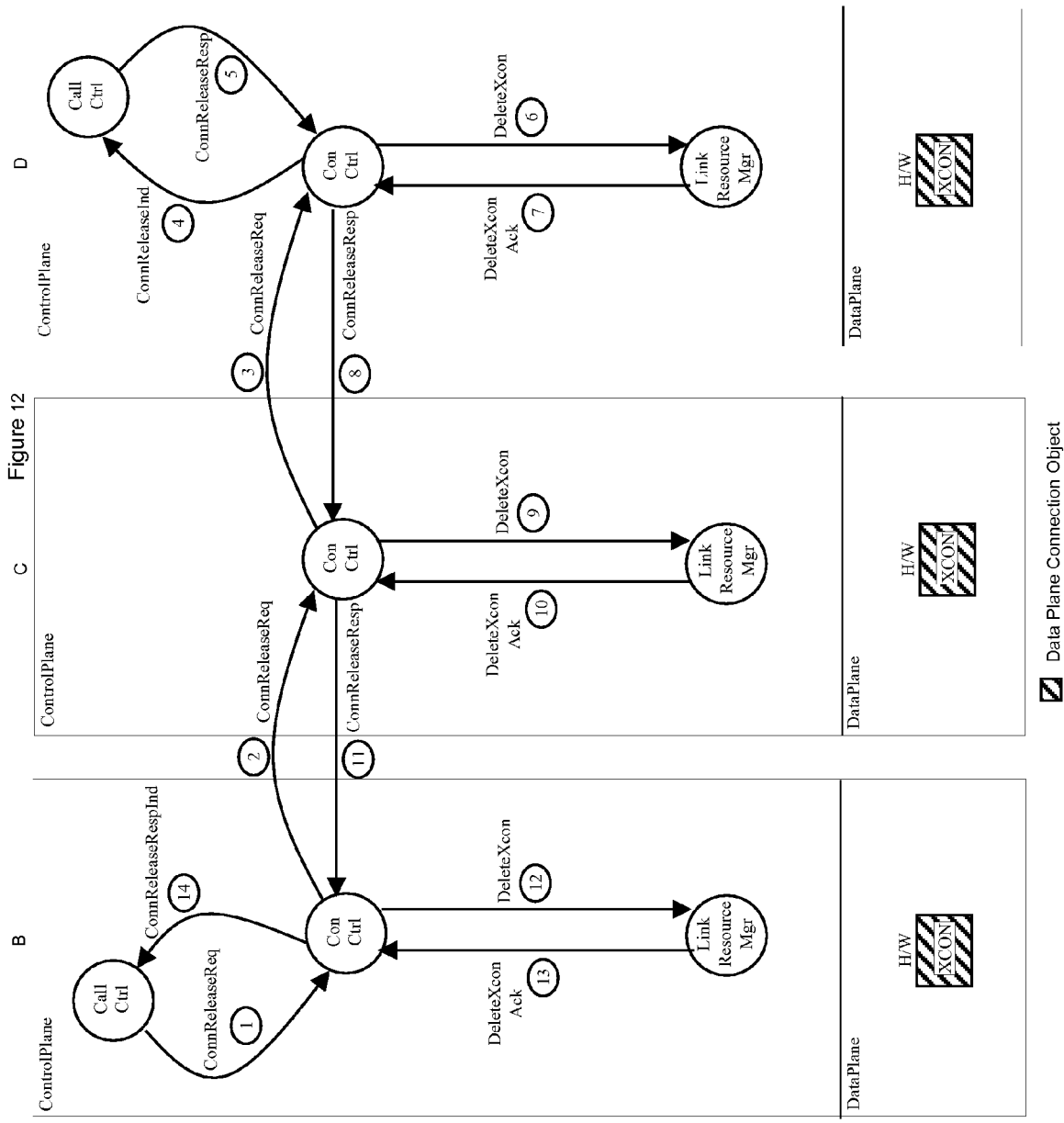
FIG. 12 shows the message sequence to terminate the original control plane connection (and call) in accordance with the second step.
Figure 13:
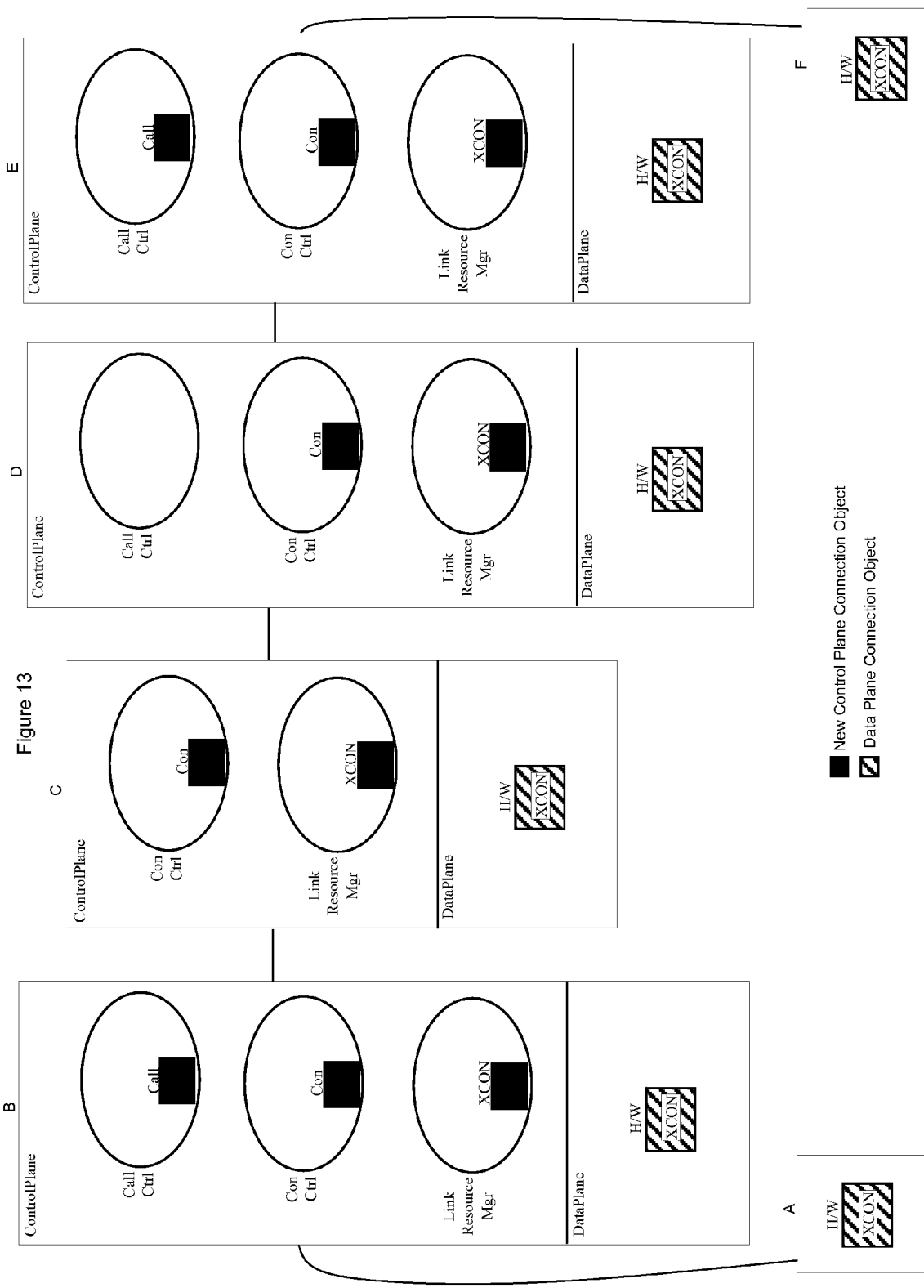
FIG. 13 shows the objects after performing this termination.

FIG. 12 shows the message sequence to terminate the original control plane connection (and call) in accordance with the second step, while FIG. 13 shows the objects after performing this termination. Note that during this termination the ownership of the data plane connection XCON objects (hashed) has been transferred from the original control plane connection XCON objects to the new control plane connection XCON objects.

Note that a centralized control plane implementation is also possible, and within the scope of the invention. Also, although we have stated that existing data plane resources are not disrupted, an embodiment of the invention can allow for changes to the data plane resources—for example by adding bandwidth to an existing call—see below. What is important is user services are not disrupted. As another example, a call containing a Exterior Network-Network Interface (ENNI) can be replaced by a call that does not contain that Exterior Network-Network Interface. Similarly a call can be replaced by a call that includes Exterior Network-Network Interface. Thus aspects of the invention may be useful even if the nodes involved do not change.

As stated, an embodiment of the invention can allow for changes to the data plane resources—for example by modifying the bandwidth of an existing call. We will discuss an example of how to do this in terms of the RSVP-TE signaling protocol.

An initial call is established when the first connection is established. The UNI-C sends a PATH message to the UNI-N to request call and connection creation. The PATH request contains a SESSION_ATTRIBUTE TLV with SE Style requested flag set. The request does not contain a valid call identifier. The call identifier is assigned by the source UNI-N and used in all subsequent messages at the source and destination UNI-C. If the source UNI-C subsequently wants to modify the call by modifying the connection bandwidth, it will generate a new PATH message with the same Call ID it received in the RESV for the first connection. The Call ID is used to correlate the various connections at the UNI-C and UNI-N. This new PATH message will have a different LSP_ID and MESSAGE_ID but the same TUNNEL_ID. A new RESV message is generated in the reverse direction. There is a single RESV state that corresponds to all PATH states that share the same bandwidth, i.e. have the same TUNNEL_ID. There is a single RESV message sent, but its contents will change when connections are added or removed. The RESV message includes the bandwidth of the largest bandwidth request it received in the PATH messages and the SE flow descriptor includes the FILTER_SPEC of all corresponding PATH messages. If the RESV message includes a RESV_CONF object, a new RESV_CONF message should be sent by the source UNI-C which includes the new SE flow descriptor. At this point, the data can be transmitted end to end with the new bandwidth parameters, but connection state exists in the original and new PATH messages. The original PATH message can now be deleted and a PATH_TEAR generated by the UNI-C will release the RSVP states at each node. The deletion of the PATH state will result in a change in the RESV message SE flow descriptor contents as it will contain one less FILTER_SPEC. This corresponds to the step that terminates the original control plane connection state.

A bandwidth decrease can be achieved with an identical message flow although the RESV_CONF may not be necessary in that case. The new bandwidth would become effective at the PATH_TEAR stage as opposed to the RESV_CONF stage.

Additional information relating to the above modifications of the bandwidth of existing calls can be found in Call Modification RSVP Details for UNI 2.0, Contribution Number: 2005.216.00, Optical Internetworking Forum (OIF), 2005-06-30, which is hereby incorporated by reference in its entirety.

In the prior description, for purposes of explanation, numerous details have been set forth in order to provide a thorough understanding of the present invention. However, it will be apparent to one skilled in the art that these specific details are not required in order to practice the present invention. For example, specific details are not provided as to whether the embodiments of the invention described herein are implemented as a software routine, hardware circuit, firmware, or a combination thereof, or whether the control plane is centralized or distributed. Furthermore, those of ordinary skill will recognize that the features of the functionalities described herein can be implemented using processing hardware and software, such as computers or microprocessors and corresponding program and data memories. Such processors can be individual local processors or can be implemented in a central processor. Distributed processing techniques may also be used. Additionally, individual functions can be built in hard wired logic as may be desirable for the system implementation. Thus, the system according to the invention is not limited by the form of computer or processor construction, but can be implemented using any processing technique now known or later developed. For example, those of ordinary skill will recognize that a Link Resource Manager according to the invention can be implemented in a single processor or single unit or can be implemented in a plurality of units performing portions of the overall Link Resource Manager functions.

Embodiments of the invention may be represented as a software product stored on a machine-readable medium (also referred to as a computer-readable medium, a processor-readable medium, or a computer usable medium having a computer readable program code embodied therein). The machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

Accordingly, one aspect of the invention provides a computer program product embodied in a machine-readable medium tangibly embodying computer executable instructions for controlling at least a portion of a network of X nodes, wherein at least a subset Y of said nodes is controlled by a first control plane connection, said computer executable instructions comprising computer executable instructions for establishing a second control plane connection between a second subset Z of said nodes in such a manner that said second control plane connection shares data plane resources with said first control plane. According to one embodiment, the computer executable instructions for establishing a second control plane connection comprises: a) computer executable instructions for establishing a second control plane connection in parallel with said first control plane, such that both said first and second control plane connections share at least some data plane resources; and b) computer executable instructions for terminating the existing first control plane connection such that said shared data plane resources are fully transferred to the said second control plane connection without disrupting said data plane resources. According to some embodiments, Z does not equal Y. However in other embodiments Z=Y, but the data plane resources of Z differ from the data plane resources of Y (e.g., the bandwidth of Z has either increases or decreased from Y). According to some embodiments, said computer executable instructions can further comprise instructions for: creating new connection control states for the second control plane connection on each of said Z nodes; and mapping said shared data plane resources to each new connection control state. According to some embodiments, said computer executable instructions can further comprise instructions for: creating new call control states for the second control plane connection; creating new connection control states for the second control plane connection on each of said Z nodes; associating the new connection control states with the new call states; and mapping said shared data plane resources to each new connection control state.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. In a network having a data plane carrying subscriber traffic flows within end-to-end connections and a control plane for managing resources of the data plane using respective control plane connections associated with each end-to-end connection, each end-to-end connection utilizing a respective set of two or more nodes, a method for changing a span of control of the control plane from an initial span of control comprising an initial control plane connection managing data plane resources of a first subset of the respective set of nodes utilized by a given end-to-end connection, said method comprising:
   creating a new control plane connection for managing data plane resources of a second subset of the respective set of nodes utilized by the given end-to-end connection, wherein the data plane resources being managed by the new control plane connection differs from those being managed by the initial control plane connection, and wherein a new span of control of the control plane comprises the new control plane connection;
   applying resource sharing for any data plane resources that are managed by both the initial control plane connection and the new control plane connection;
   terminating the initial control plane connection; and
   transferring control of any shared data plane resources to the new control plane connection without disrupting the subscriber traffic flow within the given end-to-end connection.

2. A method as claimed in claim 1 wherein creating a new control plane connection comprises:
   creating new connection control states for the new control plane connection on each one of the second subset of nodes; and
   for each node on which new connection control states have been created, defining a mapping between the new connection control states and data plane resources of the node allocated to the given end-to-end connection.

3. A method as claimed in claim 2 wherein creating a new control plane connection further comprises:
   creating new call control states for the new control plane connection; and
   associating the new connection control states with the new call control states.

4. A method as claimed in claim 1 wherein said new control plane connection manages modified data plane resources.

5. A method as claimed in claim 1, wherein the second subset of the respective set of nodes utilized by the given end-to-end connection is larger than the first subset of the respective set of nodes utilized by the given end-to-end connection.

6. A method as claimed in claim 1, wherein the second subset of the respective set of nodes utilized by the given end-to-end connection is smaller than the first subset of the respective set of nodes utilized by the given end-to-end connection.

7. A method as claimed in claim 6, wherein two or more new control plane connections are created, each new control plane connection managing a respective portion of the first subset of the respective set of nodes utilized by the given end-to-end connection.

8. A method as claimed in claim 1, wherein two initial control plane connections manage data plane resources of respective subsets of the respective set of nodes utilized by the given end-to-end connection, and wherein the second subset of the respective set of nodes utilized by the given end-to-end connection encompasses the respective subsets of nodes being managed by both of the initial control plane connections, thus merging the two initial control plane connections.

9. A method as claimed in claim 1, the new control plane connection is coextensive with the initial control plane connection, and wherein a head and a tail of the new control plane connection are reversed from those of the initial control plane connection.

10. A method as claimed in claim 1, wherein respective initial connection control states of the initial control plane connection define the end-to-end connection as a switched connection and respective new connection control states of the new control plane connection define the end-to-end connection as a soft permanent connection.

11. A method as claimed in claim 1, wherein respective initial connection control states of the initial control plane connection define the end-to-end connection as a soft permanent connection, and respective new connection control states of the new control plane connection define the end-to-end connection as a switched connection.

12. The method of claim 1, further comprising adjusting the data plane resources allocated to the given end-to-end connection.

13. The method of claim 12, wherein adjusting the data plane resources allocated to the given end-to-end connection comprises modifying a bandwidth of an existing call associated with the end-to-end connection.

14. The method of claim 1, wherein said method is carried out via distributed processing techniques for implementing a distributed control plane, wherein said steps are executed by the respective set of nodes utilized by the given end-to-end connection, with each of said respective set of nodes performing portions of overall Link Resource Manager functions of said distributed control plane.

15. A non-transitory computer readable medium storing computer executable instructions for controlling at least a portion of a network having a data plane carrying subscriber traffic flows within end-to-end connections and a control plane for managing resources of the data plane using respective control plane connections associated with each end-to-end connection, each end-to-end connection utilizing a respective set of two or more nodes, which change a span of control from an initial span of control comprising an initial control plane connection managing data plane resources of a first subset of the respective set of nodes utilized by a given end-to-end connection, said computer executable instructions comprising:
    computer executable instructions for establishing a new control plane connection for managing data plane resources of a second subset of the respective set of nodes utilized by the given end-to-end connection, wherein the data plane resources being managed by the new control plane connection differs from those being managed by the initial control plane connection, and wherein a new span of control of the control plane comprises the new control plane connection;
    computer executable instructions for applying resource sharing for any data plane resources that are managed by both the initial control plane connection and the new control plane connection;
    computer executable instructions for terminating the initial control plane connection; and
    computer executable instructions for transferring control of any shared data plane resources to the new control plane connection without disrupting the subscriber traffic flow within the given end-to-end connection.

16. The non-transitory computer readable medium as claimed in claim 15 wherein said computer executable instructions further comprise instructions for:
    creating new connection control states for the new control plane connection on each one of the second subset of nodes; and
    for each node on which new connection control states have been created, defining a mapping between the new connection control states and data plane resources of the node allocated to the given end-to-end connection.

17. The non-transitory computer readable medium as claimed in claim 16 wherein said computer executable instructions further comprise instructions for:
    creating new call control states for the second new control plane connection; and
    associating the new connection control states with the new call control states.

* * * * *